(12) United States Patent
Holicki

(10) Patent No.: US 12,547,897 B2
(45) Date of Patent: Feb. 10, 2026

(54) POSITION DETERMINATION BY MEANS OF NEURAL NETWORKS

(71) Applicant: Cariad SE, Wolfsburg (DE)

(72) Inventor: Michael Holicki, Berlin (DE)

(73) Assignee: Cariad SE, Wolfsburg (DE)

( * ) Notice: Subject to any disclaimer, the term of this patent is extended or adjusted under 35 U.S.C. 154(b) by 715 days.

(21) Appl. No.: 17/786,802

(22) PCT Filed: Dec. 4, 2020

(86) PCT No.: PCT/EP2020/084688
§ 371 (c)(1),
(2) Date: Jun. 17, 2022

(87) PCT Pub. No.: WO2021/122067
PCT Pub. Date: Jun. 24, 2021

(65) Prior Publication Data
US 2023/0350418 A1    Nov. 2, 2023

(30) Foreign Application Priority Data

Dec. 19, 2019   (DE) .......................... 102019135294.0

(51) Int. Cl.
*G06V 10/77*  (2022.01)
*G01C 21/00*  (2006.01)
(Continued)

(52) U.S. Cl.
CPC ......... *G06N 3/084* (2013.01); *G01C 21/3848* (2020.08); *G05D 1/0246* (2013.01);
(Continued)

(58) Field of Classification Search
CPC ........ G06N 3/084; G06N 3/045; G06N 3/047; G01C 21/3848; G05D 1/0246;
(Continued)

(56) References Cited

U.S. PATENT DOCUMENTS

| 7,606,416 B2 * | 10/2009 | Han ..................... G06V 10/462 |
|  |  | 382/162 |
| 2018/0293466 A1 | 10/2018 | Viswanathan |
| 2019/0147582 A1 | 5/2019 | Lee et al. |

FOREIGN PATENT DOCUMENTS

DE    102018124211 A1    4/2019

OTHER PUBLICATIONS

Goodfellow et al., "Generative Adversarial Nets," Advances in Neural Information Processing Systems 27 (NIPS), 2014, URL= https://arxiv.org/pdf/1406.2661.pdf, downloaded on Nov. 19, 2019. (9 pages).

(Continued)

*Primary Examiner* — Kent Yip
(74) *Attorney, Agent, or Firm* — Seed Intellectual Property Law Group LLP

(57) ABSTRACT

A method for training an artificial neural generator network for the generating of synthetic landmark images is provided, in which landmark images are extracted from at least one training map as training data, which form a first training data set, and the generator network as a generator of a generative adversarial network learns with the aid of the first training data set and with the aid of real, non-annotated image data, recorded by a sensor device, to generate synthetic landmark images which are suited to reproducing the probability distribution underlying the first training data set. The invention also relates to a method for training an artificial neural localization network by the trained generator network and a method for determining a position of a mobile unit with at least one sensor device and at least one environment map by the trained localization network.

10 Claims, 2 Drawing Sheets

(51) Int. Cl.
  *G05D 1/00* (2006.01)
  *G06N 3/084* (2023.01)
  *G06V 10/44* (2022.01)
  *G06V 10/774* (2022.01)
  *G06V 10/82* (2022.01)
  *G06V 20/56* (2022.01)

(52) U.S. Cl.
  CPC .......... *G06V 10/454* (2022.01); *G06V 10/774* (2022.01); *G06V 10/82* (2022.01); *G06V 20/56* (2022.01); *G06V 2201/12* (2022.01)

(58) Field of Classification Search
  CPC .... G06V 10/454; G06V 10/774; G06V 10/82; G06V 20/56; G06V 2201/12; G06F 18/2413
  See application file for complete search history.

(56) References Cited

OTHER PUBLICATIONS

Li et al., "Sequential Adversarial Learning for Self-Supervised Deep Visual Odometry," arxiv.org, Cornell University Library, 201 Olin Library, Cornell University, Ithaca, New York 14853, Aug. 23, 2019, pp. 2851-2860. (10 pages).

Shotton et al., "Scene Coordinate Regression Forests for Camera Relocalization in RGB-D Images," 2017 IEEE Conference on Computer Vision and Pattern Recognition (CVPR), IEEE Computer Society, US, Jun. 23, 2013, pp. 2930-2937. (8 pages).

Sturm et al., "A Benchmark for the Evaluation of RGB-D SLAM Systems," Intelligent Robots and Systems (IROS), 2012 IEEE/RSJ International Conference, Ontario, Canada, Oct. 7, 2012, pp. 573-580. (8 pages).

Valigi, "GANLoc: Camera relocalization based on Conditional Adversarial Networks," Dec. 1, 2017, URL=https://nicolovaligi.com/pages/research/2017_nicolo_valigi_ganloc_camera_relocalization_conditional_adversarial_networks.pdf, retrieved on Feb. 25, 2021. (5 pages).

International Search Report, mailed Mar. 10, 2021, for International Patent Application No. PCT/EP2020/084688. (2 pages).

Written Opinion of the International Searching Authority, mailed Mar. 10, 2021, for International Patent Application No. PCT/EP2020/084688. (6 pages).

* cited by examiner

POSITION DETERMINATION BY MEANS OF NEURAL NETWORKS

BACKGROUND

Technical Field

Embodiments of the invention relate to a method for training an artificial neural generator network for the generating of synthetic landmark images and a method for training an artificial neural localization network. Embodiments of the invention further relate to a method for determining a position of a mobile unit with at least one sensor device and at least one environment map.

Description of the Related Art

Localization methods or methods for determining the position of a mobile unit find application in robotics, navigation and autonomous driving. In particular, the localization of a vehicle may be accomplished by a comparison of an environment map with an environment image which has been recorded for example by means of a vehicle camera. Typically, known landmarks, such as traffic signs, lane markings, parking place markings, etc., which are contained in the environment map, are compared with landmarks which are indicated in the recorded environment image and coordinated with each other. A very accurate position of the mobile unit can then be determined from map position indications of the known and coordinated landmarks and an initial estimated position of the vehicle, e.g., by means of GPS data.

It is furthermore known how to perform a determination of the position of a mobile unit by means of a neural network.

For example, a Siamese neural network (or a "twin" neural network) is proposed as part of a localization method in the document US 2018/0293466 A1.

The training of such neural networks, however, requires a substantial data expenditure. Furthermore, the accuracy of the position determination depends heavily on the volume and the quality of the training data set used.

BRIEF SUMMARY

The present disclosure describes efficient methods for the training of artificial neural networks with which an especially precise position determination of mobile units can be achieved.

Some embodiments relate to a method for training an artificial neural generator network for the generating of synthetic landmark images, in which landmark images are extracted from at least one training map as training data, which form a first training data set, and the generator network as a generator of a generative adversarial network learns with the aid of the first training data set and with the aid of real, non-annotated image data, recorded by a sensor device, to generate synthetic landmark images which are suited to reproducing the probability distribution underlying the first training data set.

A landmark image is an image recorded by a sensor (such as a camera) and depicting the environment of a vehicle. The landmark image may additionally comprise a landmark or a depiction of a landmark. A landmark means a striking object of an environment or the depiction of such an object of an environment.

From the real non-annotated images recorded by a sensor device, contours of objects can be extracted by means of a gradient. Such objects can be landmarks such as lane markings, parking place markings, zebra stripes, traffic signs, etc.

The at least one training map (MAP1) can be two-dimensional or three-dimensional. In particular, the training map can be a relief map. A two-dimensional training map can be efficiently compressed and requires little memory space, while a three-dimensional training map can make possible an especially precise localization.

From the training map there can be generated each time at least one image, representing a bordering frame and/or extracted points and/or extracted lines as characterizing elements of a contour of at least one object in the vehicle's environment. Such images are designated as "projection images."

The projection image can be extracted from the at least one training map as a cutout and/or projection by means of various already known computer-implemented methods. For example, a bordering frame can be generated as a characterizing element of a contour of at least one first landmark by means of a projection of a landmark from a three-dimensional training map into a two-dimensional image.

The generator network as a generator is part of a generative adversarial network (GAN), or generative competitive network. Generative competitive networks or generative adversarial networks are described in detail, for example, in the publication "Generative Adversarial Networks" by Ian J. Goodfellow, Jean Pouget-Abadie, Mehdi Mirza, Bing Xu, David Warde-Farley, Sherjil Ozair, Aaron Courville and Yoshua Bengio, Advances in Neural Information Processing Systems 27 (NIPS), 2014 (also see e-print arXiv:1406.2661, https://arxiv.org/pdf/1406.2661.pdf, downloaded on 19 Nov. 2019).

The generative adversarial network may comprise the generator network as a generator and a discriminator network as a discriminator. The generator and the discriminator can both form an artificial neural network each. The input for the generator network (known as the "latent variable space") may be a random matrix, which can be generated from a normal probability distribution, and comprise real non-annotated images. The output of the generator network may comprise a synthetic landmark image.

The input for the discriminator network may comprise the synthetic landmark image generated by the generator network as a first input and/or a landmark image of the first training data set as a second input (known as the "ground truth"). The output of the discriminator network may comprise a probability indication, where the probability indication may be the probability that a first and/or second input for the discriminator network has been derived from or generated by the generator network or the first training data set. With the aid of the probability indication, the discriminator network can also carry out a binary classification, which can be a hypothesis as to whether an input in the discriminator network has been derived from or generated by the generator network or the first training data set.

The binary classification or hypothesis can be verified or falsified with a verification algorithm. For example, the correct derivation of the particular input in the discriminator network can be saved in an associative data field. The verification algorithm can then make a comparison between the hypothesis and the associative data field.

With the aid of the binary classification and/or the verification algorithm, an adjusting of the weights of the generator network and the discriminator network can be performed, for example, by means of a minmax game or zero sum game. In a minmax game between the generator network and the discriminator network, the weights of the discriminator network can be adjusted such that the probability of correctly performing the binary classification is maximized and the weights of the generator network can be adjusted such that the probability of performing the binary classification correctly is minimized. The minmax game can be performed by means of an optimizing of a corresponding $\min_G \max_D$ loss function $V(G, D)$. The loss function, for example, can also be represented as a Jensen-Shannon divergence. The adjusting of the respective weights can be accomplished by means of a "backpropagation."

At the start of the training, the generator network can generate synthetic landmark images as output, having significant differences with respect to the first training data set or the samples of the first training data set. After multiple iteration of the training, in which the weights of the generator and the discriminator can be continuously adjusted, the synthetic landmark images generated by the generator network will increasingly resemble the first training data set or the samples of the first training data set.

The generator network and/or the discriminator network may be a "convolutional neural network." The neural generator network may comprise multiple "deconvolutional layers" and the neural discriminator network comprises multiple "convolutional layers."

In some embodiments, in a method for training an artificial neural localization network, after performing the method for training of an artificial neural generator network as already described by means of the trained generator network, synthetic landmark images are generated as training data, forming a second training data set. The localization network learns with the aid of the second training data set and the at least one projection image from a training map to determine the relative posture of a vehicle.

The input for the localization network can comprise at least one landmark image. In addition, the input for the localization network can also comprise a map or a projection image from a map. The output of the localization network may comprise at least one posture of the vehicle, or an updating of a posture of the vehicle.

The localization network may be a convolutional neural network. The learning of the localization network can be carried out by means of a machine learning method, such as a supervised machine learning method. The machine learning method may encompass a regression analysis, a pattern recognition method, and/or a classification.

With the above described method, the trained generator network can be used to quickly and efficiently generate a large number of synthetic landmark images as training data for the training of the localization network. With this synthetic training data, the localization network can be efficiently trained to determine the relative posture of an image of the second training data set with respect to an image generated from the training map. The number of samples of the first training data set may be less than the number of samples of the second training data set.

In particular, it may be advantageous that no manual marking (or "labeling") of the second training data set is needed any longer. Furthermore, the features described herein make it possible to use the localization network for the determination of a vehicle posture in which no images or environment images have ever been recorded for the training of the localization network.

Some embodiments also relate to a method for determining and/or updating a position of a mobile unit with at least one sensor device and at least one environment map after performing the already described method for training an artificial neural localization network.

The method can take into account an initial estimation of the position of the mobile unit by means of at least one other sensor device in the determination of the position of the mobile unit. The at least one additional sensor device may comprise a global positioning system (GPS), a Galileo satellite navigation system or a Beidou satellite navigation system. For example, the initial estimation of the position of the mobile unit can be performed with the aid of GPS data which have been recorded by means of the GPS. The including of an initial estimation of the position of the mobile unit can then make possible an especially fast and accurate determination of the position of the mobile unit.

The initial estimate of the position of the mobile unit can also be done by means of a tracking: the movement of the mobile unit is determined in multiple consecutively recorded images by means of an odometric method. If a starting point is known for the movement of the mobile unit, an initial estimation of the position can take place. The starting point could be, for example, a cabinet in a parking garage.

The localization algorithm may comprise a projection of at least one portion of the at least one environment map in the recorded environment image. This can be achieved by means of familiar coordinate transformations between a map coordinates system and an image coordinates system.

The at least one environment map can be two-dimensional or three-dimensional. The at least one environment map can also comprise object class indications of at least one known landmark.

The position of the mobile unit can comprise values for coordinates and/or angles of orientation. The position of the mobile unit may comprise values for coordinates and angle of orientation, which can also be called the posture. In this way, an especially precise localization of the mobile unit can be achieved.

The mobile unit can be a vehicle or a robot, for example. The at least one sensor device can comprise a camera, such as a single camera, with which at least one environment image of the mobile unit can be detected. The camera can be arranged for example on or in the mobile unit. Multiple sensor devices may also be present, e.g., one or more cameras as the first sensor device and a communication interface as the second sensor device, being part of the mobile unit.

The at least one environment map can be two-dimensional or three-dimensional. The at least one environment map can be saved on a server and be received by means of a communication interface from a server and/or via a cloud. The communication interface can comprise a transmitter unit and a receiver unit for this.

Some embodiments also provide a computer program product, comprising a computer program, having software to carry out the described method when the computer program is running in a calculating unit.

Some embodiments also provide a system which comprises a mobile unit, at least one sensor device, an environment map and at least one electronic evaluation and control unit, the system being adapted to carry out the described method. The system can also comprise a calculating unit, on which the computer program can run. The calculating unit can also be part of the at least one electronic evaluation and control unit.

The at least one electronic evaluation and control unit can comprise for example a computer, a processor, an electronic memory, a server, the at least one sensor device and/or the at least one other sensor device. The at least one electronic evaluation and control unit can be arranged inside or outside of the mobile unit.

Some embodiments can be used for the determination of the position of a mobile unit in different environments, e.g., in a parking garage, in a city, or on a highway.

For example, the features described herein can be used during the navigation of a vehicle in a parking garage. The vehicle can receive a three-dimensional environment map of the parking garage through a communication interface as soon as the vehicle drives into the parking garage, while a vehicle camera can detect an environment image of the vehicle. With the aid of the environment image, the environment map and the generated data set of the localization network K, a position of the vehicle in real time can then be determined or updated.

BRIEF DESCRIPTION OF THE SEVERAL VIEWS OF THE DRAWINGS

Embodiments of the invention are represented in the drawings and shall be explained below with the aid of FIGS. 1 to 3.

In the following, features which repeat in FIGS. 1 to 3 are given the same reference numbers each time.

DETAILED DESCRIPTION

Figure 1:
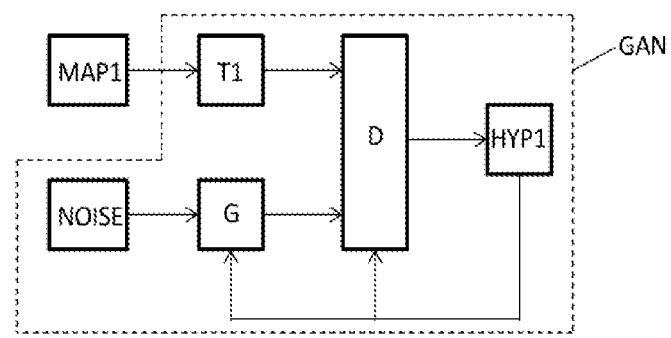
FIG. 1 shows a flow chart of a method for training an artificial neural generator network.

FIG. 1 shows a flow chart of a method for training an artificial neural generator network G to generate synthetic landmark images, in which landmark images are extracted from at least one training map MAP1 as training data, forming a first training data set T1, and the generator network G as the generator of a generative adversarial network GAN learns with the aid of the first training data set T1 and with the aid of real non-annotated image data, recorded by a sensor device V1 (not shown in FIG. 1) to generate synthetic landmark images which are suited to reproducing the probability distribution underlying the first training data set T1.

The generative adversarial network GAN comprises the generator network G as the generator and a discriminator network D as the discriminator. The generator G and the discriminator D each form an artificial convolutional neural network. The input for the generator network G (known in English as the "latent variable space") is a random matrix or a random number which is generated from a normal probability distribution NOISE. In addition, real non-annotated image data recorded by a sensor device V1 (not shown in FIG. 1) are also used as input for the generator network G.

The input for the discriminator network D comprises synthetic landmark images generated by the generator network G as the first input and landmark images of the first training data set T1 as the second input (called the "ground truth"). The output of the discriminator network D is a binary classification HYP1, concerning a hypothesis as to whether the first and second input for the discriminator network D have been generated by or derived from the generator network G or the first training data set T1.

With the aid of the binary classification HYP1, an adjustment of the weights of the generator network G and the discriminator network D is then performed by means of a minmax game. The adjustment of the respective weights is accomplished by means of a "backpropagation."

Figure 2:
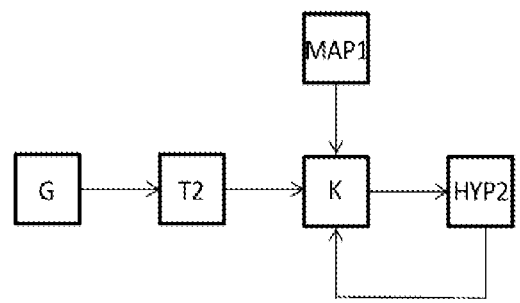
FIG. 2 shows a flow chart of a method for training an artificial neural localization network.

FIG. 2 shows a flow chart of a method for training an artificial neural localization network K, where after performing the method for training of the artificial neural generator network G as shown in FIG. 1, synthetic landmark images are generated by means of the trained generator network G as training data, forming a second training data set T2. The localization network K learns with the aid of the second training data set T2 and the at least one training map MAP1 to determine the specific relative posture of a vehicle with respect to an environment.

The input for the localization network K comprises at least one landmark image from the second training data set T2 and the at least one training map MAP1. The output of the localization network K comprises at least one determination and/or updating of a relative posture of an image of the second training data set (T2) with respect to an image generated from the training map (MAP1). The output of the localization network K is designated as HYP2 in FIG. 2.

The localization network K is a convolutional neural network. The weights of the localization network K are continuously adjusted by means of a supervised machine learning method.

Figure 3:
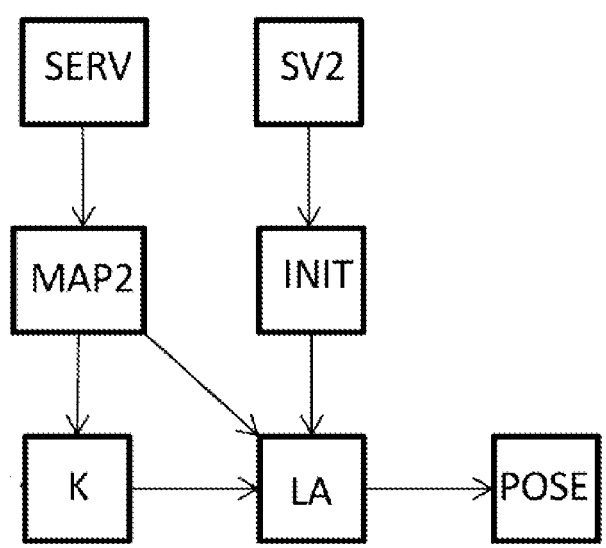
FIG. 3 shows a flow chart of a method for determining a position of a mobile unit.

FIG. 3 describes a method for determination of a position of a vehicle (POSE) as a mobile unit with a single camera as the sensor device SV1 and an environment map MAP2. The environment map MAP2 is stored on a server SERV and received by means of a communication interface, also arranged on the vehicle.

By means of a localization algorithm LA, the position of the vehicle (POSE) is determined and/or updated with the aid of the output of the localization network (K) and with the aid of the environment map MAP2. The localization algorithm (LA) also takes into account an initial estimation of the position of the vehicle (INIT).

The initial estimate of the position of the vehicle (INIT) can be done by means of another sensor device SV2, designed as a GPS sensor. Alternatively, the initial estimate of the position of the vehicle (INIT) can be done by means of a tracking: the movement of the mobile unit is determined in multiple consecutively recorded images by means of an odometric method.

The vehicle coordinates system is chosen such that one axis of the vehicle coincides with a coordinate axis of the vehicle coordinates system. The single camera SV1 is arranged on the vehicle and firmly joined to the vehicle, so that a coordinates transformation can be achieved between the vehicle coordinates system and the image coordinates system taking into account the optical properties of the single camera SV1 (focal width, scale factors, etc.). Then the position of the vehicle POSE can be determined from the coordinate transformations by means of already known methods of projective geometry. The position of the vehicle comprises values for the three coordinates of a map coordinates system and for three angles of orientation.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for training an artificial neural generator network that generates synthetic landmark images, comprising:

extracting landmark images from at least one training map as training data, which form a first training data set, and training the artificial neural generator network as a generator of a generative adversarial network using the first training data set and real, non-annotated image data, recorded by a sensor device, to generate synthetic landmark images which are suited to reproducing a probability distribution underlying the first training data set, wherein an input of the artificial neural generator network comprises at least one image of the sensor device as real non-annotated image data.

2. The method according to claim 1, wherein the at least one training map comprises a first known landmark and/or an object class indication of a first known landmark.

3. The method according to claim 1, wherein the at least one training map is three-dimensional or two-dimensional.

4. A method for training an artificial neural localization network, comprising:

performing a method for training an artificial neural generator network that generates synthetic landmark images, by extracting landmark images from at least one training map as training data, which form a first training data set, and wherein the artificial neural generator network as a generator of a generative adversarial network learns using the first training data set and using real, non-annotated image data, recorded by a sensor device, to generate synthetic landmark images which are suited to reproducing a probability distribution underlying the first training data set;

after performing the method for training of the artificial neural generator network, generating synthetic landmark images as training data, forming a second training data set; and wherein the artificial neural localization network learns using the second training data set and using the at least one training map to determine a relative posture of an image of the second training data set relative to an image generated from the training map.

5. The method according to claim 4, wherein the artificial neural localization network is a convolutional neural network and/or is trained by a supervised machine learning method.

6. A method for determining a position of a mobile unit with at least one sensor device and at least one environment map, including an initial position estimation, the method comprising:

performing a method for training an artificial neural generator network that generates synthetic landmark images, by extracting landmark images from at least one training map as training data, which form a first training data set, and wherein the artificial neural generator network as a generator of a generative adversarial network learns using the first training data set and using real, non-annotated image data, recorded by a sensor device, to generate synthetic landmark images which are suited to reproducing a probability distribution underlying the first training data set;

performing a method for training an artificial neural localization network, by, after performing the method for training of the artificial neural generator network, generating synthetic landmark images as training data, forming a second training data set; and wherein the artificial neural localization network learns using the second training data set and using the at least one training map to determine a relative posture of an image of the second training data set relative to an image generated from the training map; and after the images recorded by the sensor device are processed by the artificial neural generator network and results are generated for the determination of a relative posture by the artificial neural localization network, performing an updating of an initial position of the mobile unit by a comparison between the initial position estimation and the relative posture from the artificial neural localization network.

7. The method according to claim 6, wherein when determining the position of the mobile unit an initial estimation of the position of the mobile unit is made by an odometric method.

8. The method according to claim 6, wherein when determining the position of the mobile unit an initial estimation of the position of the mobile unit is taken into account by at least one other sensor device.

9. The method according to claim 6, wherein the at least one environment map is three-dimensional or two-dimensional.

10. The method according to claim 6, wherein a position of the mobile unit comprises values for coordinates and/or angle of orientation.

* * * * *